(12) United States Patent
Xue et al.

(10) Patent No.: US 9,895,783 B2
(45) Date of Patent: Feb. 20, 2018

(54) VEHICLE WHEEL POSITIONING DEVICE

(71) Applicant: CITIC Dicastal CO., LTD, Qinhuangdao (CN)

(72) Inventors: Bowen Xue, Qinhuangdao (CN); Donghui Zhang, Qinhuangdao (CN); Jiandong Guo, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 138 days.

(21) Appl. No.: 15/074,592

(22) Filed: Mar. 18, 2016

(65) Prior Publication Data

US 2016/0346887 A1    Dec. 1, 2016

(30) Foreign Application Priority Data

Jun. 1, 2015   (CN) .......................... 2015 1 0291292

(51) Int. Cl.
| | | |
|---|---|---|
| *B29D 30/06* | (2006.01) | |
| *B23Q 7/04* | (2006.01) | |
| *B25J 15/02* | (2006.01) | |
| *B29D 30/08* | (2006.01) | |
| *B60B 3/00* | (2006.01) | |
| *B60B 30/00* | (2006.01) | |
| *B60B 30/06* | (2006.01) | |

(52) U.S. Cl.
CPC .......... *B23Q 7/043* (2013.01); *B25J 15/0253* (2013.01); *B25J 15/0286* (2013.01); *B29D 30/06* (2013.01); *B29D 30/08* (2013.01); *B60B 3/00* (2013.01); *B60B 30/00* (2013.01); *B60B 30/06* (2013.01)

(58) Field of Classification Search
CPC .. B25J 15/0253; B25J 15/026; B25J 15/0286; B29D 30/06; B29D 30/08; B29D 30/10
See application file for complete search history.

(56) References Cited

U.S. PATENT DOCUMENTS

| | | | | |
|---|---|---|---|---|
| 4,106,888 | A | * | 8/1978 | Calori ................ B29D 30/0678 425/36 |
| 4,132,318 | A | * | 1/1979 | Wang ..................... B25J 13/082 414/739 |
| 4,160,007 | A | * | 7/1979 | Pizzorno ............ B29D 30/0661 264/271.1 |
| 4,174,940 | A | * | 11/1979 | Pizzorno ............ B29D 30/0661 425/36 |
| 4,279,856 | A | * | 7/1981 | Vente ................. B29D 30/0649 264/313 |
| 2013/0249157 | A1 | * | 9/2013 | Endo ....................... D06F 67/04 269/56 |
| 2017/0173801 | A1 | * | 6/2017 | Gebrian ................. B25J 15/026 |

* cited by examiner

*Primary Examiner* — Gerald McClain

(74) *Attorney, Agent, or Firm* — Hamre, Schumann, Mueller & Larson, P.C.

(57) ABSTRACT

A vehicle wheel positioning device, including a frame, a jacking cylinder and two sliding sleeves fixed on a bottom plate, the outputting end of the jacking cylinder is connected with a top plate, and a belt pulley connected to a servo motor via a shaft. A vehicle wheel may be positioned via the top plate during a vehicle wheel finish turning automation processing, without switching programs for automation production of the wheel with different wheel widths and different offset distances.

1 Claim, 2 Drawing Sheets

VEHICLE WHEEL POSITIONING DEVICE

FIELD OF THE INVENTION

The invention relates to a positioning device, and particularly to a positioning device before the vehicle wheel finish turning automation processing.

BACKGROUND OF THE INVENTION

Vehicle wheel serves as an important outer part of automobiles, its visual effects have been continuously improved. In many product categories, finish turning type products have often been preferred, but the processing difficulty of finish turning products is quite large, especially that it is now not automatically processed in current industry. As in general automated processing, manipulators both clamp the front rim section of the wheel, the front side of the finish turning product is not allowed to be touched again after being processed, such that the manipulators have to clamp the lower end of the rim in the finish turning type products automation processing. In order to change the type of the wheel without altering the operation program of a robot, therefore, the manipulators are required at every clamping time that the lower end face of the wheel must be positioned on the fixed height, and the valve hole position can be identified, so as to achieve height measurement of the end face inside the machine after mounting and clamping. Based on the above situations, the present device works well to solve those.

SUMMARY OF THE INVENTION

The object of the invention is to provide a vehicle wheel positioning device which is able to achieve positioning function before a vehicle wheel finish turning automation processing, without switching programs for automation production of the wheel with different wheel widths and different offset distances.

In order to achieve the above-mentioned object, the technical solution of the invention is: a vehicle wheel positioning device, constituted of a frame, a jacking cylinder, a guide post I, a sliding sleeve I, a bottom plate, a top plate, a pinch roller, a left sliding plate, a rack, a guide rail, a fixed plate, a gear, a shaft I, a shaft II, a bearing seat, a lifting plate, a belt pulley I, a belt pulley II, a lifting cylinder, a sliding sleeve II, a guide post II, a servo motor I, a belt pulley III, a right sliding plate, a servo motor II and a belt pulley IV, the jacking cylinder and two sliding sleeves I are fixed on the bottom plate, the outputting end of the jacking cylinder is connected with the top plate, two guide posts I fixed on the lower end of the top plate are matched with the sliding sleeves I; the left sliding plate and right sliding plate to the lower end of which two pinch rollers are respectively connected are fixed below the fixed plate by the guide rail; the shaft I below which the gears are fixed and above which the belt pulleys II are fixed is fixed inside the shaft II by bearings; both the left sliding plate and the right sliding plate above are fixed with a rack and gears, and the rack and the gear are engaged with each other.

The lower end of the shaft II is fixed above the fixed plate, the upper ends of the shaft II are mounted with the belt pulleys I, the shaft II is fixed within the bearing seat below the lifting plate; two lifting cylinders and four sliding sleeves II are all fixed on the top end of the frame; the outputting ends of the lifting cylinders are articulated with the upper ends of the lifting plate; four guide posts II fixed above the lifting plate are matched with the sliding sleeves II; the servo motor I on the outputting ends of which the belt pulleys III are mounted is mounted above the lifting plate by the flange, driving the belt pulleys I to rotate; the servo motor II on the outputting ends of which the belt pulley IV are mounted is also mounted above the lifting plate by the flange, driving the belt pulleys II to rotate.

In actual use, the servo motor II drives the shaft I and the gear to rotate by the belt pulley IV, drives motion of the rack, making pinch rollers below left and right sliding plates to clamp the wheel by the guide rail; the lifting cylinder lifts the wheel to detach from roller way by the guide post II; the servo motor I drives the fixed plate and the wheel and others to rotate by the belt pulleys III and the belt pulleys I, and the wheel stops rotating after identification system identifies the valve hole position; at this time, the jacking cylinder lifts the top plate to a fixed height by the guide posts I, the servo motor II makes pinch rollers to release the wheel by the belt pulley IV; the wheel is positioned above the top plate.

The object of the invention in use is able to achieve positioning function before the vehicle wheel finish turning automation processing, without switching programs for automation production of the wheel with different wheel widths and different offset distances. It also has outstanding advantages of wide suitable range, high degree of automation, safety and stable performances, and low production costs.

Figure 1:
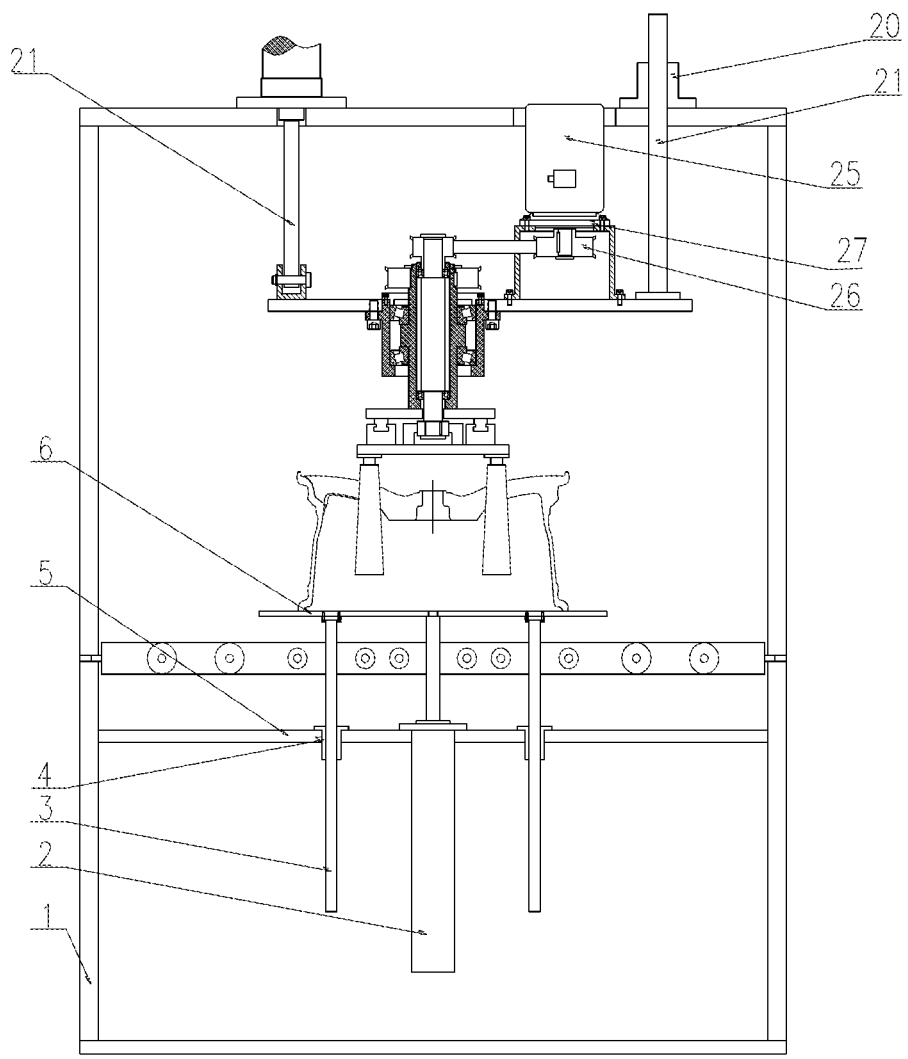
FIG. 1 is the left view of a vehicle wheel positioning device of the invention.
Figure 2:
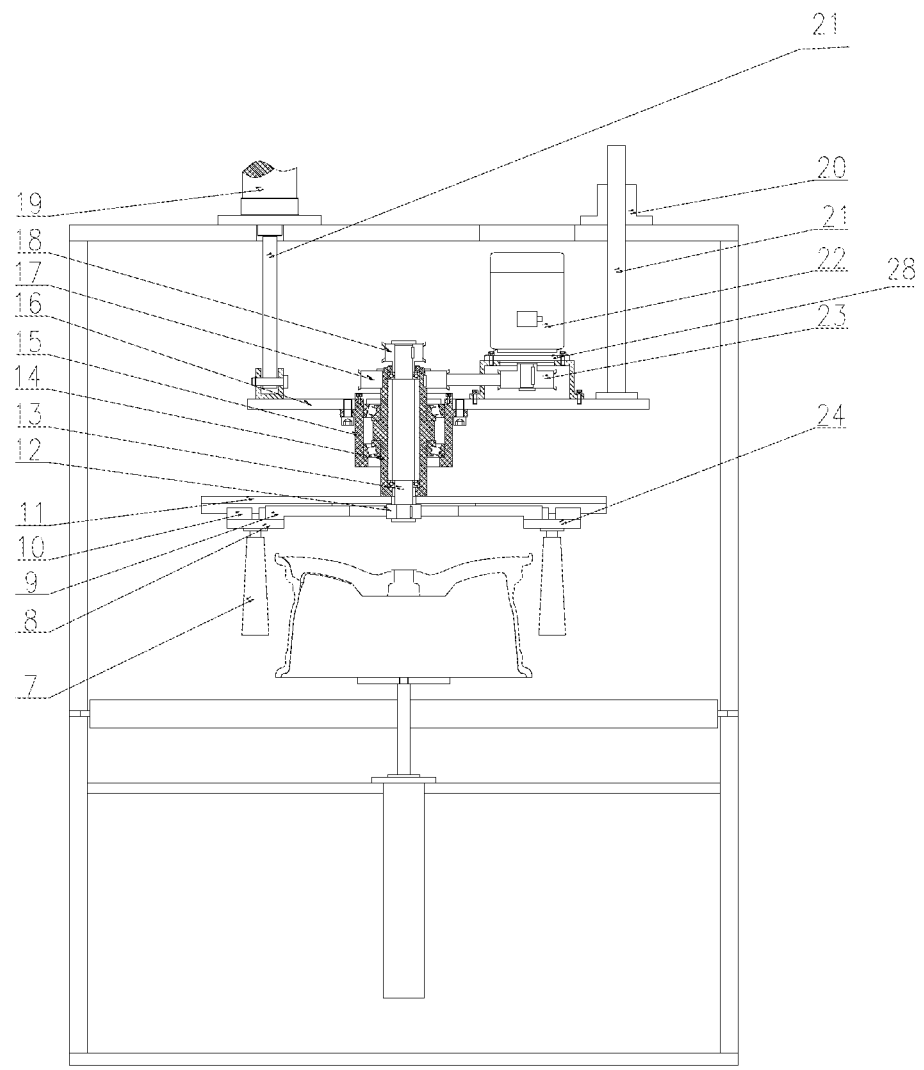
FIG. 2 is the front view of a vehicle wheel positioning device of the invention.

In figures, 1—frame, 2—jacking cylinder, 3—guide post I, 4—sliding sleeve I, 5—bottom plate, 6—top plate, 7—pinch roller, 8—left sliding plate, 9—rack, 10—guide rail, 11—fixed plate, 12—gear, 13—shaft I, 14—shaft II, 15—bearing seat, 16—lifting plate, 17—belt pulley I, 18—belt pulley II, 19—lifting cylinder, 20—sliding sleeve II, 21—guide post II, 22—servo motor I, 23—belt pulley III, 24—right sliding plate, 25—servo motor II, 26—belt pulley IV, 27—flange II, 28—flange I.

DETAILED DESCRIPTION OF THE INVENTION

Details and working conditions of the specific device presented according to the invention have been described below with reference to the drawings.

The device is constituted of a frame 1, a jacking cylinder 2, a guide post I 3, a sliding sleeve I 4, a bottom plate 5, a top plate 6, a pinch roller 7, a left sliding plate 8, a rack 9, a guide rail 10, a fixed plate 11, a gear 12, a shaft I 13, a shaft II 14, a bearing seat 15, a lifting plate 16, a belt pulley I 17, a belt pulley II 18, a lifting cylinder 19, a sliding sleeve II 20, a guide post II 21, a servo motor I 22, a belt pulley III 23, a right sliding plate 24, a servo motor II 25, and a belt pulley IV 26, the jacking cylinder 2 and two sliding sleeves I 4 are fixed on the bottom plate 5, the outputting end of the jacking cylinder 2 is connected with the top plate 6, two guide posts I 4 fixed on the lower end of the top plate 6 are matched with the sliding sleeve I 4; the left sliding plate 8 and right sliding plate 24 to the lower end of which two pinch rollers 7 are respectively connected are fixed below the fixed plate 11 by the guide rail 10; the shaft I 13 below which the gears 12 are fixed and above which the belt pulleys II 18 are fixed is fixed inside the shaft II 14 by the bearing; both the left sliding plate 8 and the right sliding plate 24 above are fixed with the rack 9 and the gear 12, and the rack 9 and the gear 12 are engaged with each other.

The lower end of the shaft II 14 is fixed above the fixed plate 11, the upper ends of the shaft II 14 are mounted with the belt pulleys I 17, the shaft II 14 is fixed within the bearing seat 15 below the lifting plate 16; two lifting cylinders 19 and four sliding sleeves II 20 are all fixed on the top ends of the frame 1; the outputting ends of the lifting cylinders 19 are articulated with the upper ends of the lifting plate 16; four guide posts II 21 fixed above the lifting plate 16 are matched with the sliding sleeve II 20; the servo motor I 22 on the outputting ends of which the belt pulleys III 23 are mounted is mounted above the lifting plate 16 by the flange I 26, driving the belt pulleys I 17 to rotate; the servo motor II 25 on the outputting ends of which the belt pulley IV 26 are mounted is mounted above the lifting plate 16 by the flange II 27, driving the belt pulleys II 18 to rotate.

During working process, the servo motor II 25 drives the shaft I 13 and the gear 12 to rotate by the belt pulley IV 26, drives motion of the rack 9, making pinch rollers 7 below left and right sliding plates to clamp the wheel by the guide rail 10; the lifting cylinders 19 lift the wheel to detach from roller way by the guide post II 21; the servo motor I 22 drives the fixed plate 11 and the wheel and others to rotate by the belt pulleys III 23 and belt pulleys I 17, and the wheel stops rotating after identification system identifies valve hole position; at this time, the jacking cylinder 2 lifts the top plate 6 to a fixed height by the guide posts I 3, the servo motor II 25 makes pinch rollers 7 to release the wheel by the belt pulley IV 26; the wheel is positioned above the top plate 6.

The invention claimed is:

1. A vehicle wheel positioning device, comprising:
a frame, a jacking cylinder, two guide posts I, four guide posts II, two sliding sleeves I, four sliding sleeves II, a bottom plate, a top plate, two pinch rollers, a left sliding plate, a right sliding plate, a rack, a guide rail, a fixed plate, a gear, a shaft I, a shaft II, a bearing seat, a lifting plate, a belt pulley I, a belt pulley II, a belt pulley III, a belt pulley IV, two lifting cylinders, a servo motor I, and a servo motor II, wherein the jacking cylinder and the two sliding sleeves I are fixed on the bottom plate, and an output end of the jacking cylinder is connected with the top plate, wherein the two guide posts I are fixed on the lower end of the top plate and matched with the two sliding sleeves I, respectively, the left sliding plate and the right sliding plate, which are each connected with one pinch roller at lower ends of the respective sliding plates, respectively, are fixed below the fixed plate by the guide rail, wherein the rack and the gear are fixed above both the left sliding plate and the right sliding plate, and the rack and the gear are engaged with each other, wherein the shaft I, below which the gears are fixed and above which the belt pulley II is fixed, is fixed inside the shaft II by the bearing, wherein a lower end of the shaft II is fixed above the fixed plate, an upper end of the shaft II is mounted with the belt pulley I, and the shaft II is fixed within the bearing seat below the lifting plate, wherein the two lifting cylinders and the four sliding sleeves II are all fixed on the top end of the frame, wherein output ends of the two lifting cylinders are articulated with the upper end of the lifting plate, wherein the four guide posts II are fixed above the lifting plate and matched with the four sliding sleeves II, respectively, wherein the servo motor I, on the output end of the servo motor I of which the belt pulley III is mounted, is mounted above the lifting plate by a flange I, driving the belt pulley I to be rotated, and wherein the servo motor II, on the output end of the servo motor II of which the belt pulley IV is mounted, is also mounted above the lifting plate by a flange II, driving the belt pulley II to be rotated.

\* \* \* \* \*